United States Patent
Hu et al.

(10) Patent No.: US 10,346,445 B2
(45) Date of Patent: Jul. 9, 2019

(54) SYSTEMS AND METHODS FOR USE IN DETERMINING DETAILED LOCATIONS FOR CERTAIN ENTITIES

(71) Applicant: MASTERCARD INTERNATIONAL INCORPORATED, Purchase, NY (US)

(72) Inventors: Po Hu, Norwalk, CT (US); Henry Weinberger, New York, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 200 days.

(21) Appl. No.: 14/978,735

(22) Filed: Dec. 22, 2015

(65) Prior Publication Data
US 2017/0177618 A1    Jun. 22, 2017

(51) Int. Cl.
*G06F 17/30*      (2006.01)
*G06F 7/00*      (2006.01)
(Continued)

(52) U.S. Cl.
CPC .......... *G06F 16/29* (2019.01); *G06F 16/2477* (2019.01); *G06F 16/24575* (2019.01);
(Continued)

(58) Field of Classification Search
CPC ......... G06F 17/30241; G06F 17/30528; G06F 17/30551; G06F 16/24575; G06F 16/29;
(Continued)

(56) References Cited

U.S. PATENT DOCUMENTS 7,369,981 B1 *  5/2008  Saghier ............... G06F 11/3409
                                                       702/179
8,856,045 B1 * 10/2014  Patel .................. G06Q 20/3823
                                                    705/64

(Continued)

FOREIGN PATENT DOCUMENTS

EP          2937828 A1    10/2015

OTHER PUBLICATIONS

U.S. Appl. No. 15/361,791, filed Nov. 28, 2016, Hu et al.
(Continued)

*Primary Examiner* — Kuen S Lu
(74) *Attorney, Agent, or Firm* — Harness, Dickey & Pierce, P.L.C.

(57) ABSTRACT

Exemplary embodiments of systems and methods are provided for determining detailed locations of entities. One exemplary method includes receiving at least one signal record for a communication device associated with a user. The at least one signal record includes multiple signal strengths, a temporal indicator, and an identifier unique to the communication device. The exemplary method further includes accessing multiple discrete event records associated with the entity, correlating one of the multiple discrete event records to the at least one signal record based on the temporal indicator included in the at least one signal record, and generating a location range associated with the entity, based on the signal strengths included in the at least one signal record, whereby a location of the entity, distinct from one or more other entities, is indicated by the location range.

18 Claims, 3 Drawing Sheets

(51) Int. Cl.
*G06F 16/29* (2019.01)
*G06F 16/2458* (2019.01)
*G06F 16/2457* (2019.01)
*H04W 4/02* (2018.01)
*G06Q 10/08* (2012.01)
*G06Q 30/00* (2012.01)
*G06Q 30/02* (2012.01)

(52) U.S. Cl.
CPC ......... *G06Q 10/0833* (2013.01); *G06Q 30/00* (2013.01); *G06Q 30/0238* (2013.01); *G06Q 30/0261* (2013.01); *H04W 4/02* (2013.01)

(58) Field of Classification Search
CPC . G06F 16/2477; H04W 4/02; G06Q 10/0833; G06Q 30/00; G06Q 30/0238; G06Q 30/0261
USPC ......................................................... 707/724
See application file for complete search history.

(56) References Cited

U.S. PATENT DOCUMENTS

| | | |
|---|---|---|
| 2007/0139269 A1 | 6/2007 | Chen et al. |
| 2009/0012704 A1 | 1/2009 | Franco et al. |
| 2010/0153778 A1* | 6/2010 | Weber ................ G06F 17/3051 714/16 |
| 2010/0189312 A1 | 7/2010 | Nielsen et al. |
| 2011/0028160 A1 | 2/2011 | Roeding et al. |
| 2011/0260922 A1 | 10/2011 | Zhang et al. |
| 2012/0066062 A1 | 3/2012 | Yoder et al. |
| 2013/0282533 A1 | 10/2013 | Foran-Owens et al. |
| 2014/0022986 A1 | 1/2014 | Wu et al. |
| 2014/0344041 A1 | 11/2014 | Yeleswarapu |
| 2014/0358741 A1 | 12/2014 | Howe |
| 2015/0058088 A1 | 2/2015 | Unser et al. |
| 2015/0120550 A1* | 4/2015 | Jung ................ G06Q 20/3224 705/44 |
| 2015/0154639 A1 | 6/2015 | Dupont et al. |
| 2015/0163634 A1 | 6/2015 | Meredith et al. |
| 2015/0186909 A1 | 7/2015 | Malgatti et al. |
| 2015/0281083 A1* | 10/2015 | Kim .................... H04L 45/7457 370/235 |
| 2017/0091764 A1* | 3/2017 | Lloyd ................ G06Q 20/401 |
| 2017/0178189 A1 | 6/2017 | Hu et al. |
| 2017/0178216 A1 | 6/2017 | Hu et al. |

OTHER PUBLICATIONS

"Pattern Recognition; Measuring the intensity of spontaneous faction action units with dynamic Bayesuan network",Youngqiang Li et al.; www.elsevier.com/locate/pr; Apr. 29, 2015; 11 pgs.
"Identifying Emotional Expressions, Intensities and Sentence level Emotion Tags using a Supervised Framework", Dipankar Das et al.; Department of Computer Science and Engineering, Jadavpur University; 2010 ©; 10 pgs.
U.S. Appl. No. 14/978,686, filed Dec. 22, 2015, Hu et al.
U.S. Appl. No. 14/978,706, filed Dec. 22, 2015, Hu et al.

\* cited by examiner

SYSTEMS AND METHODS FOR USE IN DETERMINING DETAILED LOCATIONS FOR CERTAIN ENTITIES

FIELD

The present disclosure generally relates to systems and methods for use in determining detailed locations for certain entities, and in particular, to determining location ranges, based on correlations between discrete records for certain entities and signal records, as captured by users, at and/or in proximity to the entities.

BACKGROUND

This section provides background information related to the present disclosure which is not necessarily prior art.

Merchant entities are known to offer products (e.g., goods, services, etc.) for sale to consumers. When consumers purchase such products from the merchant entities, via payment accounts, transaction data related to the transactions is gathered and stored within payment networks to facilitate authorization, clearing and settlement of the transactions. Address and location information associated with the merchant entities, often identified when programming point-of sale (POS) terminals at the merchant entities, is known to be included in the transaction data.

Separately, mobile communication devices associated with consumers are generally used, by the consumers, to navigate to and between locations of various merchant entities and other entities. The communication devices are known to rely on network connectivity, such as, for example, Global Positioning System (GPS) connectivity and/or wireless networks, to determine present and desired locations.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Merchant entities (e.g., merchants, etc.) offer products (e.g., goods and/or services, etc.) for sale to consumers, who in turn may purchase the products through payment accounts. In connection therewith, transaction data is generated and stored within payment networks to facilitate authorization, clearing and settlement of the transactions. The transaction data generally includes certain address data for the merchant entities, which may be used in a variety of services, such as, for example, fraud-prevention services, etc. Uniquely, the systems and methods herein permit detailed locations of merchant entities to be identified, based on signal records captured at or near the merchant entities, whereby the detailed locations (e.g., zones, etc.) of each of the merchant entities are able to be expressed as unique ranges. In particular, discrete event records (e.g., transaction records, etc.) are gathered for the merchant entities. And, signal records, indicative of relative network signal strengths at consumers' communication devices (when located at or proximate to the merchant entities), are captured and/or received for the merchant entities. By matching or otherwise correlating the signal records and the transaction records for the merchant entities based on time, the locations of the merchant entities can be expressed as ranges. The ranges are representative of distinct zones (relative to other zones and other merchant entities), within which the merchant entities are located. In this manner, detailed locations of the merchant entities (i.e., within certain zones) may be identified, which may then be employed, in real-time or near real-time, by payment networks or other entities to facilitate services for the merchant entities and/or their consumers, such as, for example, fraud-protection, advertising, etc.

Figure 1:
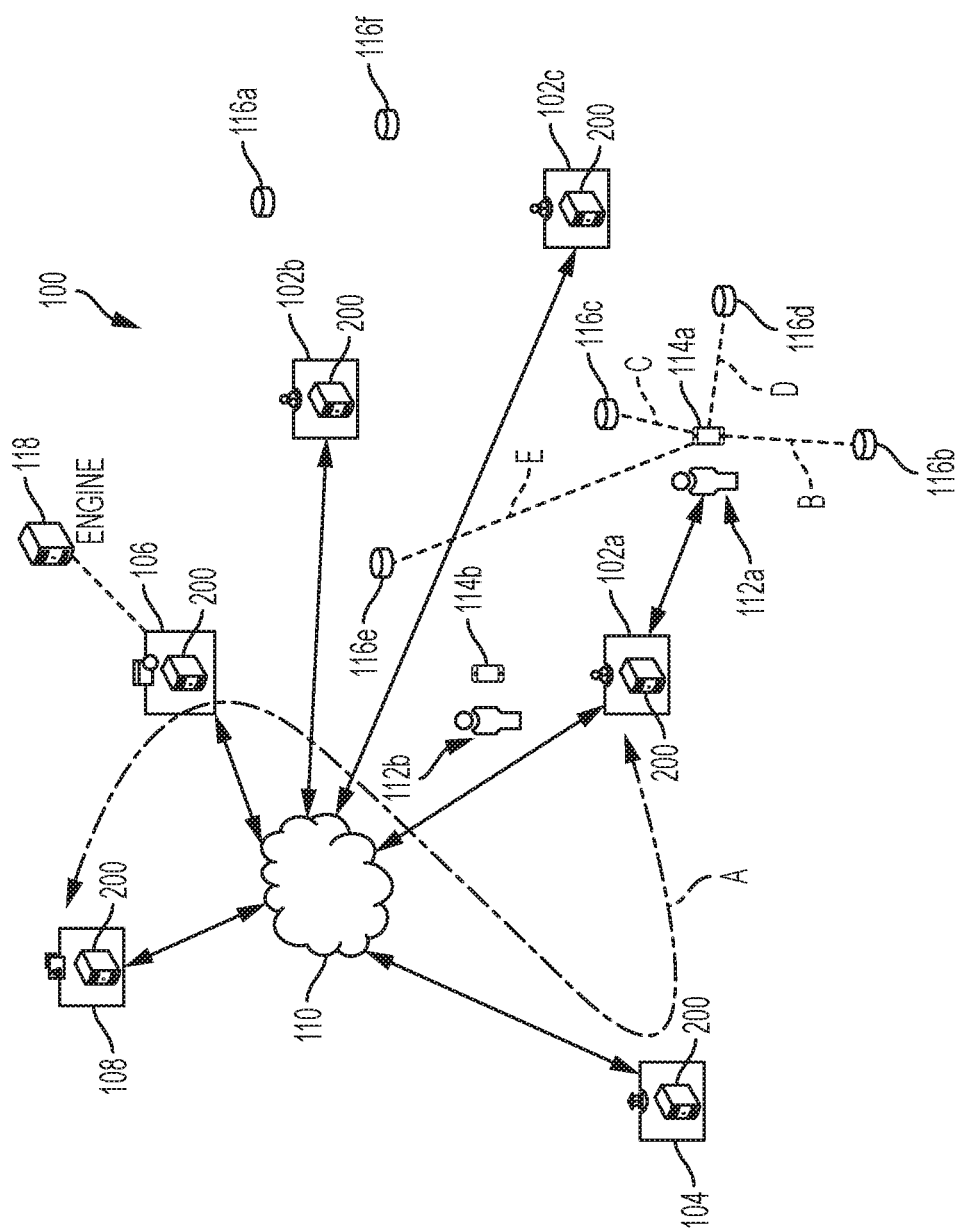
FIG. 1 is a block diagram of an exemplary system of the present disclosure suitable for use in determining detailed locations for entities, such as merchants, based on correlations between transaction records and signal records captured at or proximate to the entities.

FIG. 1 illustrates an exemplary system 100, in which the one or more aspects of the present disclosure may be implemented. Although, in the described embodiment, the system 100 is presented in one arrangement, other embodiments may include the system 100 arranged otherwise, depending, for example, on locations and/or arrangements of routers, merchant locations, merchant distributions, merchant configurations, etc.

Referring to FIG. 1, the system 100 generally includes multiple merchants 102a-c, an acquirer 104, a payment network 106, and an issuer 108, each coupled to (and in communication with) network 110. The network 110 may include, without limitation, a wired and/or wireless network, a local area network (LAN), a wide area network (WAN) (e.g., the Internet, etc.), a mobile network, and/or another suitable public and/or private network capable of supporting communication among two or more of the illustrated parts of the system 100, or any combination thereof. In one example, the network 110 includes multiple networks, where different ones of the multiple networks are accessible to different ones of the illustrated parts in FIG. 1. In this example, the network 110 may include a private payment transaction network made accessible by the payment network 106 to the acquirer 104 and the issuer 108 and, separately, a public network through which the merchants 102a-c and the payment network 106 may communicate (e.g., via internet-based applications, etc.) as described more hereinafter.

In the system 100, the multiple merchants 102a-c offer products (e.g., products and/or services, etc.) for sale to a variety of consumers, including, for example, consumers 112a-b. In turn, in response to purchase requests from the consumers 112a-b to payment accounts, the merchants 102a-c, the acquirer 104, the payment network 106, and the issuer 108 cooperate, for example, to complete payment account transaction(s) for purchases of the products.

In particular, the consumer 112a, for example, may initiate a transaction with merchant 102a by presenting a payment device (e.g., a credit card, a debit card, a fob, a smartcard, a web-based e-wallet application, etc.) to the merchant 102a. In turn, the merchant 102a receives the payment device and communicates an authorization request (e.g., including a payment account number and an amount of the purchase, etc.) to the acquirer 104 to determine whether the payment account is in good standing and whether there is sufficient funds and/or credit to cover the transaction. The authorization request is transmitted along path A in the system 100, as referenced in FIG. 1. The acquirer 104 communicates the authorization request with the issuer 108, through the payment network 106, such as, for example, through the MasterCard®, VISA®, Discover®, American Express®, etc. network. In turn, if approved, an authorization reply (indicating the approval of the transaction) is transmitted back from the issuer 108 to the merchant 102a, along path A, thereby permitting the merchant 102a to complete the transaction. The transaction is later cleared and/or settled by and between the merchant 102a, the acquirer 104, and the issuer 108. If declined, however, the authorization reply (indicating a decline of the transaction) is provided back to the merchant 102a, along the path A, thereby permitting the merchant 102a to halt or terminate the transaction.

Transaction data is generated, collected, and stored as part of the above exemplary interactions among the merchant 102a, the acquirer 104, the payment network 106, the issuer 108, and the consumer 112a. The transaction data generally includes a plurality of transaction records, one for each transaction, or attempted transaction. The transaction records, in this exemplary embodiment, are stored at least by the payment network 106 (e.g., in a data structure associated with the payment network 106, etc.). Additionally, or alternatively, the merchant 102a, the acquirer 104, and/or the issuer 108 may store the transaction records in corresponding data structures, or transaction records may be transmitted between parts of system 100. The transaction records may include, for example, payment account numbers specific to the consumers (including the consumer 112a), amounts of the transactions, transaction IDs, point-of-sale (POS) terminal IDs, merchant IDs (including a merchant ID for the merchant 102a), merchant addressing, and dates/times (broadly temporal indicators) of the transactions. It should be appreciated that more or less information related to transactions, as part of either authorization or clearing and/or settling, may be included in transaction records and stored within the system 100, at the merchant 102a, the acquirer 104, the payment network 106 and/or the issuer 108.

In the embodiments herein, consumers (e.g., consumers 112a-b, etc.) involved in the different transactions are prompted to agree to legal terms associated with their payment accounts, for example, during enrollment in their accounts, etc. In so doing, the consumers voluntarily agree, for example, to allow merchants, issuers, payment networks, etc., to use transaction records generated and/or collected during enrollment and/or in connection with processing the transactions, for subsequent use in general, and as described herein.

As also shown in FIG. 1, the consumers 112a-b are associated with communication devices 114a-b, respectively, and in particular, portable communication devices (e.g., smartphones, tablets, etc.). The portable communication devices 114a-b generally move with the consumers 112a-b, as the consumers move from location to location within one of the merchants 102a-c or among the merchants 102a-c and/or other merchants (not shown). It should be appreciated that while only two consumers 112a-b and two communication devices 114a-b are illustrated in the system 100, additional ones of each may be included in other system embodiments. Similarly, additional ones of the merchants 102a-c, the acquirer 104, the payment network 106 and/or the issuer 108 may be included in other system embodiments.

With continued reference to FIG. 1, the system 100 includes multiple routers 116a-f. As used herein, the term "router" should be understood broadly to include a variety of different networking devices, which are capable of generating one or more wireless network(s) and/or providing availability to one or more network(s), often wireless network(s). The term "router" should further be understood broadly to include different routers, switches, gateways, hotspots, modems, adapters, access points, and/or other suitable devices, etc.

In the system 100, the routers 116a-f each generate and/or make available (i.e., but not necessarily accessible) at least one wireless network having a range, such that when communication devices 114a-b are within the range, the communication devices 114a-b are able to "see" the wireless network and signal strength associated with the wireless network (at its current location). The routers 116a-f may provide public, private, secured or unsecured networks. Each of the routers 116a-f is unhidden, however, so that each can be seen by the communication devices 114a-b when within its range (even when the communication devices 114a-b are not able to access the wireless network provided thereby). In FIG. 1, for example, the communication device 114a is located within the range of routers 116b, 116c, 116d, and 116e, as indicated by dotted lines B, C, D, and E, respectively. As the communication device 114a moves, over time, it may leave the range of one or more of the routers 116b, 116c, 116d, and 116e and enter the range of one or more other routers (e.g., routers 116a or 116f, etc.), etc.

The routers 116a-f are disposed about and/or within proximity to the merchants 102a-c. Often, the routers 116a-f are associated with one or more of the merchants 102a-c or proximate merchants, businesses, schools, etc., to provide wireless networks to consumers, employees, visitors, students, etc. It should be appreciated, however, that the positions of the routers 116a-f are merely representative, and not necessarily drawn to any precise distribution and/or scale. More generally, the routers 116a-f may be disposed relative to one or more of the merchants 102a-c (or other merchants), so that when the consumers 112a-b are shopping for and/or purchasing products, the communication devices 114a-b are situated within the range of multiple of the networks from the routers 116a-f (e.g., as shown in FIG. 1 where communication device 114a is situated within the range of routers 116b-e, as indicated by lines B-E, etc.) or other routers (not shown). When within the range of the routers 116a-f, the communication device 114a is able to capture signals strengths for the networks provided thereby. Additionally, or alternatively, the communication device 114a, for example, transmits a signal, which is received by one or more of routers 116a-f. The signal may be indicative of the signal strength captured by the communication device 114a, or may be merely a signal indicative of a unique APP ID of the communication device 114a (by which the communication device 114a may be identified), for example, whereby the routers 116a-f then determine the signal strength.

It should be appreciated that one or more networks provided by the routers 116a-f may be included in network 110. As such, the merchants 102a-c and/or the portable communication devices 114a-b may be coupled to (and in communication with) network 110, via one or more of the routers 116a-f, so that the one or more networks provided by the routers 116a-f are accessible to one or both of the communication devices 114a-b.

Figure 2:
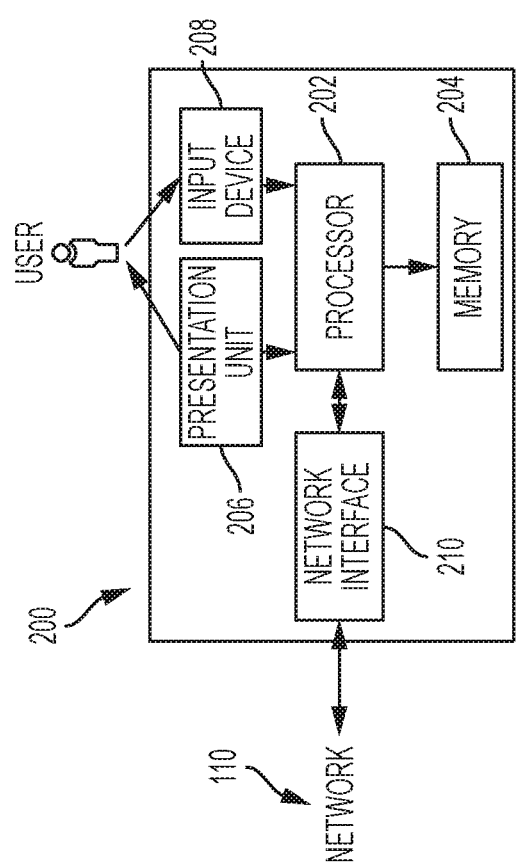
FIG. 2 is a block diagram of a computing device that may be used in the exemplary system of FIG. 1.

FIG. 2 illustrates an exemplary computing device 200 that can be used in the system 100. The computing device 200 may include, for example, one or more servers, workstations, personal computers, tablets, networking devices, laptops, smartphones, PDAs, etc. In addition, the computing device 200 may include a single computing device, or it may include multiple computing devices located in close proximity or distributed over a geographic region, so long as the computing devices are specifically configured to function as described herein. However, the system 100 should not be considered to be limited to the computing device 200, as described below, as different computing devices and/or arrangements of computing devices may be used. In addition, different components and/or arrangements of components may be used in other computing devices.

In the exemplary embodiment of FIG. 1, each of the merchants 102a-c, the acquirer 104, the payment network 106, and the issuer 108 are illustrated as including, or being implemented in, computing device 200, coupled to (and in communication with) the network 110. In addition, the portable communication devices 114a-b associated with consumers 112a-b, the routers 116-a-f, and correlation engine 118 can each be considered a computing device consistent with, or implemented in, computing device 200 for purposes of the description herein.

The exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic circuit (PLC), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, discrete event records (e.g., transaction records, etc.), signal records, zones and/or zone maps, ranges, scores, advertising content, and/or other types of data (and/or data structures) suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 that is performing one or more of the various operations herein. It should be appreciated that the memory 204 may include a variety of different memories, each implemented in one or more of the functions or processes described herein.

In the exemplary embodiment, the computing device 200 includes a presentation unit 206 that is coupled to (and in communication with) the processor 202 (however, it should be appreciated that the computing device 200 could include output devices other than the presentation unit 206, etc.). The presentation unit 206 outputs information, either visually or audibly to a user of the computing device 200, such as, for example, the consumer 112a associated with the portable communication device 114a, etc. It should be further appreciated that various interfaces (e.g., search result interfaces, etc., as defined by internet-based applications, etc.) may be displayed at computing device 200, and in particular at presentation unit 206, to display such information. The presentation unit 206 may include, without limitation, a liquid crystal display (LCD), a light-emitting diode (LED) display, an LED, an organic LED (OLED) display, an "electronic ink" display, speakers, etc. In some embodiments, presentation unit 206 includes multiple devices.

The computing device 200 also includes an input device 208 that receives inputs from the user (e.g., from consumer 112a, etc.) (i.e., user inputs) of the computing device 200. The input device 208 is coupled to (and in communication with) the processor 202 and may include, for example, a keyboard, a pointing device, a mouse, a button, a stylus, a touch sensitive panel (e.g., a touch pad or a touch screen, etc.), another computing device, and/or an audio input device. Further, in various exemplary embodiments, a touch screen, such as that included in a tablet, a smartphone, or similar device, operates as both a presentation unit and an input device.

In addition, the illustrated computing device 200 also includes a network interface 210 coupled to (and in communication with) the processor 202 and the memory 204. The network interface 210 may include, without limitation, a wired network adapter, a wireless network adapter, a mobile network adapter, or other device capable of communicating to/with one or more different networks, including the network 110. Further, in some exemplary embodiments, the computing device 200 includes the processor 202 and one or more network interfaces 210 incorporated into or with the processor 202.

With reference again to FIG. 1, the system further includes the correlation engine 118. The correlation engine 118 is specifically configured, often by computer-executable instructions, to perform one or more of the operations described herein. In the exemplary embodiment, the correlation engine 118 is a standalone part of the system 100, generally associated with the payment network 106 but separate therefrom as indicated by the dotted line in FIG. 1. In other embodiments, the correlation engine 118 may be incorporated into the payment network 106 (e.g., in the computing device 200 associated with the payment network 106, etc.), or parts thereof, and in still other embodiments, the correlation engine 118 may be incorporated elsewhere in the system 100, including, for example, in the issuer 108, etc.

The correlation engine 118 is configured to access transaction data generated by, included in, and/or stored in the payment network 106, for the merchants 102a-c, for transactions involving the consumers 112a-b and/or other consumers. As indicated above, each of the transactions involving the merchants 102a-c, to payment accounts associated with the consumers 112a-b, includes a corresponding transaction record. The transaction record includes at least a temporal indicator and a merchant identifier (or ID), and potentially either (or both of) a consumer identifier (or ID) or an application identifier (or APP ID) that is unique to the particular one of the communication devices 114a-b being used (e.g., via an electronic wallet application, etc.). It should be appreciated that the correlation engine 118 may access the transaction data, and in particular, the transaction records, including any information, as necessary or desired, for use as described herein, including for example, from the payment network 106, or otherwise, etc.

The correlation engine 118 further includes a data structure (not shown) in memory (e.g., memory 204, etc.), in which signal strength records are stored and accessed. For example, the communication devices 114a-b are configured (e.g., by internet-based applications, etc.), such that, when the consumers 112a-b and the communication devices 114a-b are in proximity to the merchants 102a-c, the communication devices 114a-b capture signal strengths from the routers 116a-f that are in range (e.g., routers 116b-e for communication device 114a in FIG. 1, etc.). The communication devices 114a-b are configured to then transmit signal records (including the corresponding signal strengths) to the correlation engine 118, at one or more regular or irregular intervals, or in real-time (e.g., instantaneously, within milliseconds, etc.) or near real-time (e.g., a time frame resulting in no significant delays, etc.) when the records are captured. Alternatively, in numerous embodiments, the routers 116a-f may be configured, by an internet-based application (e.g., executable instructions, etc.), to capture signals from the communication devices 114a-b, to determine a signal strength associated with the signals, and to transmit the signal strengths (and an associated APP ID for the communication devices 114a-b, for example) to the correlation engine 118. Like above, the routers 116a-f, or ones thereof, may then transmit signal records (including the corresponding signals strengths) to the correlation engine 118, at one or more regular or irregular intervals, or in real-time or near real-time when the records are captured.

In turn, the correlation engine 118 is configured to receive the signal records from the communication devices 114a-b (or from the routers 116a-f) and store the same in the data structure (e.g., in memory 204, etc.).

As the consumers 112a-b and their portable communication devices 114a-b, for example, move between merchants 102a-c (and/or other merchants (not shown)) or even within ones of the merchants 102a-c, and as a result, among routers 116a-f in the system 100, the signal strengths for the routers 116a-f (or signals received from the routers 116a-f), which are within range of and/or received by the portable communication devices 114a-b, change. As such, the signal records may be captured and transmitted by the communication devices 114a-b (or from the routers 116a-f) at any regular interval (e.g., every 0.5 seconds, 1 second, 5 seconds, 20 seconds, 40 seconds, 1 minute, 2 minutes, 5 minutes, etc.) or irregular interval, or based on movement of the communication devices 114a-b, or based on one or more other conditions or criteria.

Table 1 below illustrates exemplary signal records for the routers 116b-e, as captured by the communication device 114a when located, generally, as shown in FIG. 1. The signal records generally include, at least in this exemplary embodiment, a temporal indicator (e.g., a time and/or date, etc.), a signal strength or intensity for each of the routers 116b-e, and an application identifier (APP ID). The APP ID is associated with one or more of the internet-based applications installed and active in the communication device 114a (or the communication device 114b, as appropriate), and unique to the communication device 114a or the consumer 112a. As such, the APP ID can be used by the correlation engine 118, as necessary, to identify the consumer 112a and/or the consumer's communication device 114a. A payment zone is further provided for each of the signal records. Payment zones may be determined over time as correlations are drawn between APP IDs, time slots, and transaction data, which is described in detail below, and assigned by the routers 116a-f and/or the correlation engine 118. If the payment zone is not known when the signal record is initially stored, it may be appended to the signal record, for example, by the correlation engine 118, once the association is defined.

TABLE 1

| Temporal Indicator | APP ID | Signal Intensities | | | | Zone |
| --- | --- | --- | --- | --- | --- | --- |
| | | Router 116b | Router 116c | Router 116d | Router 116e | |
| Month/Day/Year 11:50 AM | 114a | 0.823502 | 0.332641 | 0.018466 | 0.208735 | B |
| Month/Day/Year 11:51 AM | 114a | 0.5264 | 0.603432 | 0.072134 | 0.369233 | C |
| Month/Day/Year 11:52 AM | 114a | 0.128009 | 0.938956 | 0.889838 | 0.0744431 | D |
| Month/Day/Year 11:54 AM | 114a | 0.880901 | 0.964187 | 0.604075 | 0.904093 | A |

As shown in Table 1, at temporal indicator Month/Day/Year 11:50 AM, the communication device (having APP ID 114a) captured signal strengths (or intensities) from the various routers 116b-e (e.g., router IDs, etc.) having the values indicated. The communication device 114a then captured additional signal strengths from the same routers 116b-e one minute later at 11:51 AM, two minutes later at 11:52 AM, and so on.

It should be appreciated that the signal records in Table 1 are merely exemplary, and should not be understood to be indicative and/or contradictory to the relative positions of the routers 116b-e and/or the communication device 114a shown in FIG. 1. Further, it should be appreciated that when signal records are received from the routers 116a-f, each signal record may include only a single signal strength for a communication device 114a (or communication device 114b), and be ordered, by temporal indicator or by router or router ID. The records may then be processed, by the correlation engine 118, according to, for example, the APP ID or temporal indicator, to make the records consistent with Table 1 or another data structure.

In addition in the system 100, the correlation engine 118 is configured to, after receiving and storing the signal records and after accessing transaction records, correlate the signal records for one of the merchants 102a-c (or for another merchant) and the transaction records for the corresponding one of the merchants 102a-c, based on time and/or the temporal indicator included in each record. When the engine 118 correlates the records, the engine 118 is then able to associate the communication devices 114a-b (from which the signal record(s) originated) to the consumers 112a-b, and in particular, the payment accounts associated therewith. For example, when multiple transaction records for the consumer 112a line up at the same time and at the same location as signal records for the communication device 114a, the correlation engine 118 is able to correlate the communication device 114a to the consumer 112a with a degree of confidence. Future signal records from the communication device 114a and/or from the routers 116a-f may then be used to track the location of the consumer 112a.

Further, the correlation engine 118 is configured to then generate an average score range (or location range), based on the signal strength(s) in the correlated records, at the time of purchase transactions. The average score range is determined by the correlation engine 118 after several records have been gathered that are likely to have occurred at a particular one of the merchants 102a-c or a particular area within one of the merchant's stores (e.g., to determine a general or relative location of the merchants 102a-c, etc.). The signal strengths for each of the applicable routers 116a-f are then averaged based on the signal strengths for each of the router 116a-f from each of the transactions likely to have occurred at the particular merchant. Because the communication devices 114a-b, when in particular locations, may not always yield identical signal strength data and because the communication devices 114a-b may not always be in identical locations during transactions, the average of the multiple signal strengths is calculated in order to provide a value that, when a new signal strength data point is close to it, indicates that a transaction is likely to have occurred at the associated merchant. Allowable variance in the signal strength records may be defined during configuration of the correlation engine 118 such that the correlation engine 118 can make accurate correlations. For example, a variance threshold may be based on an average signal strength score associated with signal strength values of a set of past signal records that coincide with past transaction records associated with a merchant. Or, a variance threshold may be based on a minimum signal strength score and a maximum signal strength score associated with signal strength values of a set of past signal records that coincide with past transaction records associated with a merchant.

The average score range, for a given set of the routers 116a-f, as generated, is unique to the particular one of the merchants 102a-c at issue. Based on the range, the correlation engine 118 is configured to then compile a zone map, of the relative signal strengths in a region, which segregates the region into the different merchants 102a-c in the region. In this manner, subsequent signal records may be assigned to a zone within the zone map, if none is already assigned, based on the relative signal strengths captured by the communication devices 114a-b, in real-time or near real-time, thereby identifying the consumer's location relative to the merchants 102a-c. The relative location of the consumers 112a-b may then be used in a variety of services, including to provide offer content (e.g., coupons, discounts, rebates, etc.) to the communication devices 114a-b, when the consumer s112a-b are in and/or proximate to particular ones of the merchants 102a-c, etc. For example, the correlation engine 118 may interact with an offer engine (not shown, but see Applicant's co-pending US application titled "Systems and Methods for use in Directing Product Offer Content to Consumers," filed on the same day as the instant application, and Applicant's co-pending US application titled "Systems and Methods for use in Determining Product Positions within Shopping Regions," also filed on the same day as the instant application, both of which are incorporated herein by reference in their entireties), which relies on the zone map, the consumer's location and/or transaction history for the consumers 112a-b, to cause offer content to be displayed at the consumers' communication devices 114a-b. Other services, such as, for example, fraud-prevention, may further rely on the consumer's location relative to merchants 102a-c.

Figure 3:
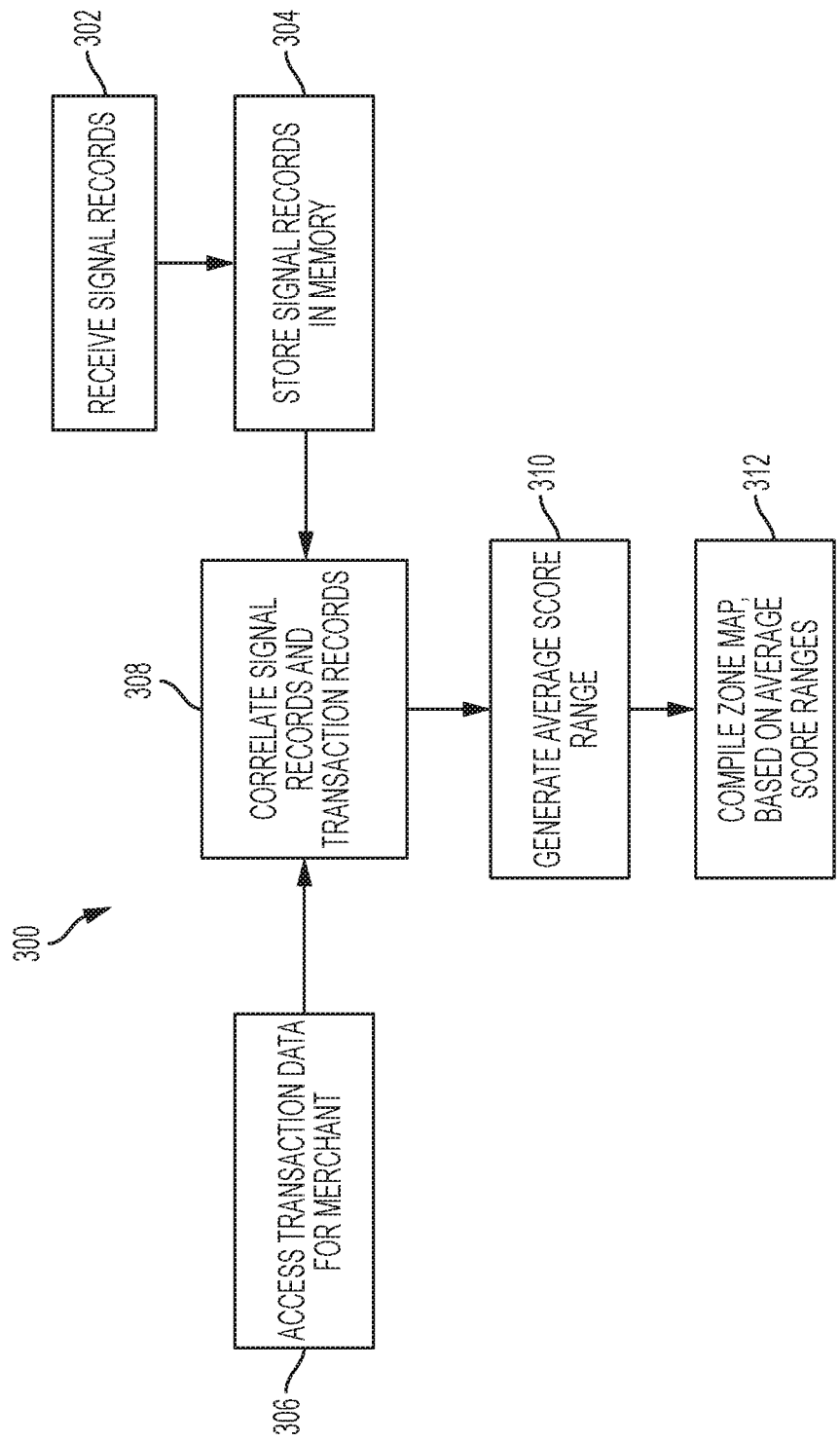
FIG. 3 is an exemplary method for use in determining detailed location ranges for merchants based on correlated transaction records and signal records, which may be used in the system of FIG. 1.

FIG. 3 illustrates an exemplary method 300 for determining detailed locations of certain entities, and in particular, merchant entities or merchants, based on correlated transaction records and signal records. The method 300 is described with reference to the system 100, and in particular, as operations of the portable communication devices 114a-b and the correlation engine 118. It should be appreciated, however, that the methods described herein are not limited to the communication devices 114a-b and/or the correlation engine 118, or the system 100. And, likewise, the systems described herein are not limited to the exemplary method 300.

At 302 in the method 300, the correlation engine 118 receives signal records from one or more of the communication devices 114a-b (e.g., communication device 114a in the following description, etc.). Alternatively, the correlation engine 118 receives the signal records from one or more of the routers 116a-f, as previously described. The signal records, as indicated above in Table 1, for example, generally include the strength of multiple signals captured by or from the communication device 114a at a specific time, and a temporal indicator for the signals (e.g., date and time, etc.). The signal records are sent to the correlation engine 118, and/or are retrieved by the engine 118 from the communication device 114a or the routers 116a-f, immediately or intermittently at one or more regular or irregular intervals. For example, and as previously described, the communication device 114a may transmit signal records to the correlation engine 118 every 0.5 seconds, 10 seconds, 1 minute, 5 minutes, hour, or even every day, etc. In at least one embodiment, the communication device 114a transmits the signal records in real time, as captured, or substantially in real time, where the signal records are used for services in addition to those described related to generating zone maps (e.g., fraud-prevention, advertising, etc.).

Once received, the correlation engine 118 stores the signal records, at 304, in memory associated with the engine 118 (e.g., memory 204, etc.). In this exemplary embodiment, each of the signal records is appended in a data structure, such as a table or other similar structure, into which multiple signal records may be compiled, based on the communication device 114a from which the signal record originated (e.g., by APP ID, etc.), temporal indicator, etc. Table 1, for example, illustrates one such data structure.

Separately in the method 300, the correlation engine 118 accesses transaction data, at 306, for transactions by consumers (e.g., consumers 112a-b, other consumers, etc.) at one or more of the merchants 102a-c. The transaction data is often accessed for a specific time interval, and/or for a particular region such as one including the merchants 102a-c (e.g., based on location data included in the transaction records, etc.), etc. The correlation engine 118 may access the transaction data from the payment network 106, or other part of the system 100, as appropriate.

Next in the method 300, the correlation engine 118 correlates, at 308, the signal records and the accessed transaction data (i.e., the transaction records associated therewith) based on the temporal indicators included in the records. As described, in so doing the communication device 114a can be identified to a payment account associated with the consumer 112a. The correlation engine 118 continues to correlate additional consumers and communication devices in the data structure, based on additional records, as available, and based on one or more criteria, such as for example, sufficient records to establish a desired confidence interval, etc.

Table 2 illustrates example transaction records at merchants A, B, C, D, E, F . . . X, Y, Z to payment accounts for consumers 112a and 112b at times T1, T2, T3, T4, T5, T7, and T11. Table 2 also illustrates example signal records (without the captured signal strengths given) associated with communication devices 114a and 114b (identified as having APP ID 114a and 114b), at corresponding times T1, T2, T3, T4, T5, T7, and T11. As shown, each of the signal records is associated with one of the merchants, for example, based on a payment zone for the signal record (as discussed above in connection with the signal records illustrated in Table 1). However, the association between merchant and zone may not be present initially. In that case, the correlation engine 118 determines patterns using multiple data points of transaction data and signal records in combination. If a set of similar signal records line up in the same time period as a set of transactions at a merchant (e.g., one of merchants A-X in Table 2, etc.), the association between the merchant and the set of similar signal records may be formed and a zone designation may be assigned to similar signal records gathered in the future.

TABLE 2

| | Payment Accounts | | | Signal Records | | |
|---|---|---|---|---|---|---|
| | Consumer 112a | Consumer 112b | ... | App ID 114a | App ID 114b | ... |
| Merchant A | | | | | | |
| Merchant B | T1 | T1 | | T1 | T1 | |
| Merchant C | | T7 | | | T7 | |
| Merchant D | | | | T2 | | |
| Merchant E | | | | | | |
| Merchant F | T4 | T4 | | T4 | T2 | |
| ... | | | | | | |
| Merchant X | | | | T3 | | |
| Merchant Y | | T5 | | | T5 | |
| Merchant Z | T11 | | | T11 | | |
| ... | | | | | | |

As shown in Table 2, at time T1, both communication devices 114a-b capture and provide a signal record to the correlation engine 118 with a time T1. Separately at time T1, each of the payment accounts for the consumers 112a-b includes a transaction record for merchant B. As such, the correlation engine 118 correlates these records for the consumers 112a-b and the communication devices 114a-b. However, some of the records illustrated in Table 2 may require more than one correlation between the transaction records of the consumers 112a-b and the signal records of the communication devices 114a-b in order to determine correct correlations between the consumers 112a-b and communication devices 114a-b. For instance, at time T4 and time T11, the correlation engine 118 initially identifies the correlation between the consumer 112a and the communication device 114a, and then at time T5 and time T7, the correlation engine 118 identifies the correlation between the consumer 112b and the communication device 114b.

It should be appreciated that the records presented in Table 2 are exemplary in nature and are intended to illustrate the correlation described herein. It should also be appreciated that multiple other transaction records involving other payment accounts, and other signal records for other communication devices may be included in Table 2 and subject to correlation by the correlation engine 118 as described herein. In addition, the times T1, T2, T3, etc., illustrated in Table 2 may represent time slots of about 30 minutes, but different time slots (e.g., 5 minutes, 10 minutes, 45 minutes, 1 hour, or 3 hours, etc.) may be used in other examples.

In the method 300, the correlation engine 118 employs the following algorithms (1), (2), (3) to determine an error rate for the number of preliminarily correlated records, identified by the engine 118.

$$1 \text{ time} = \sim K \quad (1)$$

$$2 \text{ times} = K/(N*M) \quad (2)$$

$$3 \text{ times} = K/(N*M)^2 \quad (3)$$

In the algorithms (1), (2), and (3), K is the number of consumers observed in a merchant store or location (e.g., merchant B in Table 2, etc.) in a time slot (e.g., time T1 in Table 2, etc.), N is the number of merchant stores in an area (e.g., a metropolitan area, a mall or other shopping center, etc.), and M is the number of time slots that are tracked (over which records are collected).

In general in the method 300, and through the algorithms (1), (2), and (3), if more transaction and signal records are correlated between a given consumer and a given communication device, there is a higher chance that an association between the consumer and the communication device is correct or accurate. As such, the algorithms (1), (2), and (3) comparatively show that the error of a single transaction matched with a single signal record is quite high (a transaction at that time period may correlate to any of the potentially multiple communication devices present at that time period). However, once two matches are made, the chance of error significantly decreases. In many embodiments, K is on the order of 10's or 100's of customers, and the product of N and M may be quite large. For instance, if there are 100 stores in the area of interest and the data gathered is over 100 time slots, the resulting error would be on the order of K/10,000 (or, 1% for a K of 100 consumers) as a result of two matches/correlations between a consumer and a communication device, and on the order of K/100,000,000 (or 0.0001% for a K of 100 customers) as a result of 3 matches/correlations between the consumer and the communication device. In many embodiments, the error may be even lower, especially as the number of matches/correlations between a consumer and a communication device increases over time. It should be appreciated that a maximum error allowed for a trusted correlation may be defined as a threshold employed by the correlation engine 118.

With continued reference to FIG. 3, once sufficient correlated records are identified, the engine 118 generates an average score range (or location range) for the merchants 102a-c, at 310. In particular, the engine 118 combines the signal strength data for each of the applicable routers 116a-f (for which such data is available) in each record associated with one of the merchants 102a-c (or payment zone) to determine the average score range for each of the routers 116a-f. The average score range, which may also include (or may be defined by) minimum and maximum values, may be used to determine whether later signal records indicate that a communication device is located within the associated merchant and/or zone. The correlation engine 118 then compiles a zone map for the region including the merchants 102a-c, at 312.

Table 3 shows exemplary signal records associated with routers 116a-d, as received from exemplary communication devices CD1-6 (having APP IDs of CD1-6). In Table 3, the communication devices CD1-3 have similar sets of signal strengths and are grouped together. And, the communication devices CD4-6 have similar sets of signal strengths and are grouped together. The average of the signal strengths for each of the routers 116a-d, for each of the two sets of communication devices, is also illustrated, as well as the minimum value and maximum value for each of the routers 116a-d. The average value, the minimum value, and the maximum value is then assigned to a payment zone, for example, zone A for communication devices CD1-3 and zone B for communication devices CD4-6, which may be associated with a particular merchant or a particular location within a merchant store. The average value, the minimum value, and the maximum value (broadly indicative of the location range) may be expressed in the context of the signal strength for the given set of routers (as illustrated in Table 3), or otherwise, as desired.

TABLE 3

| APP-ID | Router 116a | Router 116b | Router 116c | Router 116d | Zone |
| --- | --- | --- | --- | --- | --- |
| CD1 | 0.8325 | 0.51324 | 0.3345 | 0.1212 | A |
| CD2 | 0.87147354 | 0.567145 | 0.418023 | 0.218543 | A |
| CD3 | 0.85714039 | 0.605656 | 0.366364 | 0.168302 | A |
| Average | 0.853704643 | 0.562013667 | 0.372962333 | 0.169348333 | A |
| Min | 0.8325 | 0.51324 | 0.3345 | 0.1212 | A |
| Max | 0.87147354 | 0.605656 | 0.418023 | 0.218543 | A |
| CD4 | 0.78 | 0.5 | 0.32 | 0.11 | B |
| CD5 | 0.8329942 | 0.534709 | 0.390669 | 0.143824 | B |
| CD6 | 0.91166791 | 0.601983 | 0.432752 | 0.202727 | B |
| Average | 0.841554037 | 0.545564 | 0.381140333 | 0.152183667 | B |
| Min | 0.78 | 0.5 | 0.32 | 0.11 | B |
| Max | 0.91166791 | 0.601983 | 0.432752 | 0.202727 | B |

While in Table 3 the signal records are associated with either zone A or zone B, in some embodiments, the zone designations are not initially known for the signal records. Only after the correlation engine 118 has created a sufficient number of correlations to define zones with a low level of error may the zone associations be added to the signal records. Once the zones are defined, the average signal strength values for the routers may be used to associate new signal records with defined zones if the signal strength values of the new signal records are within an allowable tolerance of the average signal strength values and/or within the minimum and maximum values of the signal strength values associated with the zone.

It should be appreciated that the functions described herein, in some embodiments, may be described in computer executable instructions stored on a computer readable media, and executable by one or more processors. The computer readable media is a non-transitory computer readable media. By way of example, and not limitation, such computer-readable media can include RAM, ROM, EEPROM, CD-ROM or other optical disk storage, magnetic disk storage or other magnetic storage device, or any other medium that can be used to carry or store desired program code in the form of instructions or data structures and that can be accessed by a computer. Combinations of the above should also be included within the scope of computer-readable media.

It should be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) receiving at least one signal record for a communication device associated with a user, the at least one signal record including multiple signal strengths, a temporal indicator, and associated with an identifier unique to the communication device; (b) accessing multiple discrete event records associated with the entity; (c) correlating one of the multiple discrete event records to the at least one signal record based on the temporal indicator included in the at least one signal record; and (d) generating a location range associated with the entity, based on the signal strengths included in the at least one signal record, whereby a location of the entity, distinct from one or more other entities, is indicated by the location range.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in defining a location of an entity through correlated signal strength and discrete event records, the method comprising:

receiving, by a computing device, at least one signal strength record for a communication device associated with a user, the at least one signal strength record including: an identifier unique to the communication device, a temporal indicator, and multiple signal strength values, each of the multiple signal strength values indicative of a signal strength of a wireless network of a different one of the multiple router devices, at the communication device and at a time and/or a date indicated by the temporal indicator;

accessing, by the computing device, multiple discrete event records associated with one entity;

correlating, by the computing device, one of the multiple discrete event records to the at least one signal strength record based on the temporal indicator included in the at least one signal strength record and a temporal indicator included in the one of the multiple discrete event records; and generating, by the computing device, a location range associated with the one entity, based on the signal strength values included in the at least one signal strength record, whereby a location of the one entity relative to the multiple router devices, distinct from one or more other entities, is indicated by the location range.

2. The computer-implemented method of claim 1, wherein each of the multiple discrete event records includes a transaction record; and wherein the one entity includes a merchant.

3. The computer-implemented method of claim 2, further comprising receiving, by the computing device, multiple signal strength records from a second communication device associated with a second user; and correlating a different one of the multiple discrete event records to at least one of the multiple signal strength records from the second communication device based on a temporal indicator included in the different one of the multiple discrete event records and the temporal indicator of the at least one of the multiple signal strength records from the second communication device;

wherein generating the location range is further based on signal strength values of the one of the multiple signal strength records from the second communication device.

4. The computer-implemented method of claim 1, further comprising generating a zone map based on at least the location range associated with the one entity, whereby a presence of a subsequent communication device at the one entity may be determined by comparing signal strength values of a subsequent signal strength record to the zone map.

5. The computer-implemented method of claim 4, wherein the location range associated with the one entity includes an average signal strength score range based on signal strength values of a plurality of signal strength records associated with event records of the one entity.

6. The computer-implemented method of claim 4, further comprising locating, by the computing device, a second communication device at a zone of the zone map when a signal strength record associated with the second communication device indicates the second communication device is within the location range associated with the one entity.

7. The computer-implemented method of claim 1, wherein correlating the one of the multiple discrete event records to the at least one signal strength record is further based on the one of the multiple discrete event records being associated with the user associated with the communication device.

8. The computer-implemented method of claim 7, wherein the one of the multiple discrete event records is a transaction record associated with a payment account of the user.

9. A computer-implemented method for correlating a consumer with a communication device, the method comprising:

receiving, by a computing device, at least one signal strength record associated with the communication device, the at least one signal strength record including a signal temporal indicator and signal location data, the signal location data including at least two signal strength values, each of the at least two signal strength values indicative of a signal strength, of a wireless network of a different one of multiple router devices, at the communication device and at a time and/or a date indicated by the temporal indicator;

accessing, by the computing device, at least one transaction record associated with the consumer; and correlating, by the computing device, the consumer with the communication device when the signal temporal indicator of the at least one signal strength record coincides with a transaction temporal indicator of the at least one transaction record and when the signal location data of the at least one signal strength record and transaction location data for the at least one transaction record indicate the same location, whereby future signal strength records associated with the communication device identify a location of the consumer.

10. The computer-implemented method of claim 9, further comprising:

receiving, by the computing device, a plurality of signal strength records, each signal strength record associated with one of a plurality of communication devices;

accessing, by the computing device, a plurality of transaction records, each transaction record associated with one of a plurality of payment accounts; and wherein correlating the consumer with the communication device includes correlating the consumer with the communication device when at least two signal strength records, of the plurality of signal strength records, associated with the communication device coincide with at least two transaction records, of the plurality of transaction records, associated with the consumer.

11. The computer-implemented method of claim 9, further comprising:

accessing, by the computing device, a zone map including at least one zone defined by at least one zone signal strength value relative to at least one router device in proximity to the at least one zone, said at least one zone representing a location of a merchant; and determining, by the computing device, that the signal location data and the transaction location data indicate the same location when the at least one signal strength value associated with the communication device is within a variance threshold of the at least one zone signal strength value of the zone of the merchant, and the transaction location data indicates the transaction occurred at the merchant.

12. The computer-implemented method of claim 11, wherein the variance threshold of the at least one zone signal strength value is based on an average signal strength score associated with signal strength values of a set of past signal strength records that coincide with past transaction records associated with the merchant.

13. The computer-implemented method of claim 11, wherein the variance threshold of the at least one zone signal strength value is based on a minimum signal strength score and a maximum signal strength score associated with signal strength values of a set of past signal strength records that coincide with past transaction records associated with the merchant.

14. The computer implemented method of claim 9, wherein the transaction record is associated with a payment account of the consumer; and
wherein correlating the consumer with the communication device includes correlating the payment account of the consumer with the communication device.

15. A system for correlating a communication device with a consumer, the system comprising:
a processor;
a network interface in communication with the processor;
at least one memory device in communication with the processor and the network interface, the at least one memory device storing signal strength records associated with a plurality of communication devices, transaction records associated with a plurality of consumers, and processor-executable instructions, which when executed by the processor, cause the processor to:
access, from the signal strength records, a signal temporal indicator and signal location data for each of the signal strength records, the signal location data for each of the signal strength records including multiple signal strength values, each of the multiple signal strength values indicative of a signal strength, of a wireless network of a different one of a plurality of router devices, at one of the plurality of communication devices and at a time and/or a date indicated by the signal temporal indicator;
access, from the transaction records, a transaction temporal indicator and transaction location data for each of the transaction records;
for each of the signal strength records, compare the signal temporal indicator and signal location data of the signal strength record to the transaction temporal indicator and transaction location data of each of the transaction records;
correlate a communication device of the plurality of communication devices with a consumer of the plurality of consumers when a signal temporal indicator and signal location data of a signal strength record associated with the communication device coincides with a transaction temporal indicator and transaction location data of a transaction record associated with the consumer, whereby future signal strength records associated with the communication device identify a location of the consumer;
calculate an error value of a correlation between the communication device and the consumer based on a number of signal strength records associated with the communication device that coincide with transaction records associated with the consumer, the error value indicating an accuracy of the correlation between the communication device and the consumer; and
store, at the at least one memory device, the correlation between the communication device and the consumer, when the error value of the correlation is within an error threshold.

16. The system of claim 15, further comprising processor-executable instructions, which when executed by the processor, cause the processor to:
receive a current signal strength record from a communication device of the plurality of communication devices;
access, from the at least one memory device, a stored correlation of the communication device and a consumer of the plurality of consumers; and
locate the consumer based on signal location data of the current signal strength record.

17. The system of claim 15, wherein the error value of a correlation is calculated based on at least a number of the plurality of consumers, a number of possible transaction locations, and a time period covered by the stored transaction records.

18. The system of claim 15, wherein the error value of the correlation is within the error threshold when at least two signal strength records associated with the communication device coincide with at least two transaction records associated with the consumer.

* * * * *